(12) United States Patent
Nagayama

(10) Patent No.: US 11,928,555 B2
(45) Date of Patent: Mar. 12, 2024

(54) SYSTEM OF QUANTUM PROCESSORS, INFORMATION PROCESSING METHOD, AND NON-TRANSITORY STORAGE MEDIUM THEREOF

(71) Applicant: MERCARI, INC., Tokyo (JP)

(72) Inventor: Shota Nagayama, Tokyo (JP)

(73) Assignee: MERCARI, INC., Tokyo (JP)

( * ) Notice: Subject to any disclaimer, the term of this patent is extended or adjusted under 35 U.S.C. 154(b) by 98 days.

(21) Appl. No.: 17/716,961

(22) Filed: Apr. 8, 2022

(65) Prior Publication Data
US 2022/0327417 A1    Oct. 13, 2022

(30) Foreign Application Priority Data
Apr. 8, 2021 (JP) .................................. 2021-065713

(51) Int. Cl.
| | |
|---|---|
| G06N 10/70 | (2022.01) |
| G06N 10/40 | (2022.01) |
| G06N 10/80 | (2022.01) |

(52) U.S. Cl.
CPC ............ *G06N 10/70* (2022.01); *G06N 10/40* (2022.01); *G06N 10/80* (2022.01)

(58) Field of Classification Search
CPC ......... G06N 10/70; G06N 10/40; G06N 10/80
See application file for complete search history.

(56) References Cited

U.S. PATENT DOCUMENTS

| | | | | |
|---|---|---|---|---|
| 7,966,549 B2 * | 6/2011 | Hollenberg | ............ | G06N 10/00 714/764 |
| 10,951,326 B1 * | 3/2021 | Reilly | ..................... | H04B 10/90 |

(Continued)

FOREIGN PATENT DOCUMENTS

| | | |
|---|---|---|
| JP | 2020530619 A | 10/2020 |
| JP | 2020533705 A | 11/2020 |
| WO | WO2020/216578 A1 | 10/2020 |

OTHER PUBLICATIONS

Ying Li and Simon C. Benjamin, "Hierarchical surface code for network quantum computing with modules of arbitrary size," Phys. Rev. A 94, 042303, 2016, 12 pgs.

(Continued)

*Primary Examiner* — Justin R Knapp
(74) *Attorney, Agent, or Firm* — Morgan, Lewis & Bockius LLP

(57) ABSTRACT

Provided is a system, an information processing method, and a non-transitory storage medium that hardly cause improper operations when a plurality of quantum processors is connected to configure a logical quantum bit. A system includes a plurality of quantum processors, each including a plurality of physical quantum bits, the system performing processing such that the quantum processors of a first group from among the plurality of quantum processors configure at least one logical quantum bit including the physical quantum bits; the quantum processors of the first group perform error checking on the logical quantum bit; the quantum processors of a second group from among the plurality of quantum processors configure at least one logical quantum bit including the physical quantum bits; if an error is detected at least in error checking on the quantum processors of the first group, the system swaps a quantum state of the quantum processors of the first group with a quantum state of the quantum processors of the second group, and the system performs error checking on the logical quantum bit.

6 Claims, 11 Drawing Sheets

(56) References Cited

U.S. PATENT DOCUMENTS

| | | | |
|---|---|---|---|
| 11,456,741 B2* | 9/2022 | Ahonen | H03K 19/00346 |
| 11,562,280 B2* | 1/2023 | Martinis | H03K 19/177 |
| 2008/0185576 A1* | 8/2008 | Hollenberg | G06N 10/00 |
| | | | 257/14 |
| 2022/0138608 A1* | 5/2022 | Ramette | G06N 10/20 |
| | | | 716/100 |
| 2022/0156622 A1* | 5/2022 | Putterman | G06N 10/00 |
| 2022/0164253 A1* | 5/2022 | On | G06F 11/1044 |

OTHER PUBLICATIONS

Mercari, Inc., JP2021065713, Decision to Grant a Patent and Search Report by Registered Search Organization, dated Feb. 7, 2023, 28 pgs.

* cited by examiner

SYSTEM OF QUANTUM PROCESSORS, INFORMATION PROCESSING METHOD, AND NON-TRANSITORY STORAGE MEDIUM THEREOF

CROSS-REFERENCE TO RELATED APPLICATION

The present application is based on and claims priority to Japanese Patent Application No. 2021-065713 filed on Apr. 8, 2021, which is incorporated herein by reference in its entirety.

BACKGROUND

The present invention relates to a system, an information processing method, and a non-transitory storage medium.

DESCRIPTION OF RELATED ART

Noisy intermediate-scale quantum (NISQ) devices, which are placed at a stage prior to quantum computers capable of quantum error correction, have been used in recent years. Moreover, studies have been conducted to make a quantum error correction with a number of physical quantum bits constituting a logical quantum bit.

For example, the following technical paper describes a study in which a plurality of quantum processors is connected to configure a logical quantum bit encoded by a surface code.

SUMMARY

If a plurality of quantum processors is connected to constitute a scalable quantum computer as in the technique described in Ying Li and Simon C. Benjamin, "Hierarchical surface code for network quantum computing with modules of arbitrary size", Phys. Rev. A 94, 042303, 2016, the configuration is premised on the proper operations of the quantum processors. However, the quantum processors may operate in an unexpected manner because of a failure or a malware attack.

The present invention provides a system, an information processing method, and a non-transitory storage medium that hardly cause improper operations when a plurality of quantum processors is connected to configure a logical quantum bit.

A system according to an aspect of the present disclosure includes a plurality of quantum processors, each including a plurality of physical quantum bits, the system performing processing such that the quantum processors of a first group from among the plurality of quantum processors configure at least one logical quantum bit including the physical quantum bits; the quantum processors of the first group perform error checking on the logical quantum bit; the quantum processors of a second group from among the plurality of quantum processors configure at least one logical quantum bit including the physical quantum bits; if an error is detected at least in error checking on the quantum processors of the first group, the system swaps a quantum state of the quantum processors of the first group with a quantum state of the quantum processors of the second group, and the system performs error checking on the logical quantum bit.

The present invention can provide a system, an information processing method, and a non-transitory storage medium that hardly cause an improper operation when a plurality of quantum processors is connected to configure a logical quantum bit.

DETAILED DESCRIPTION

Figure 1:
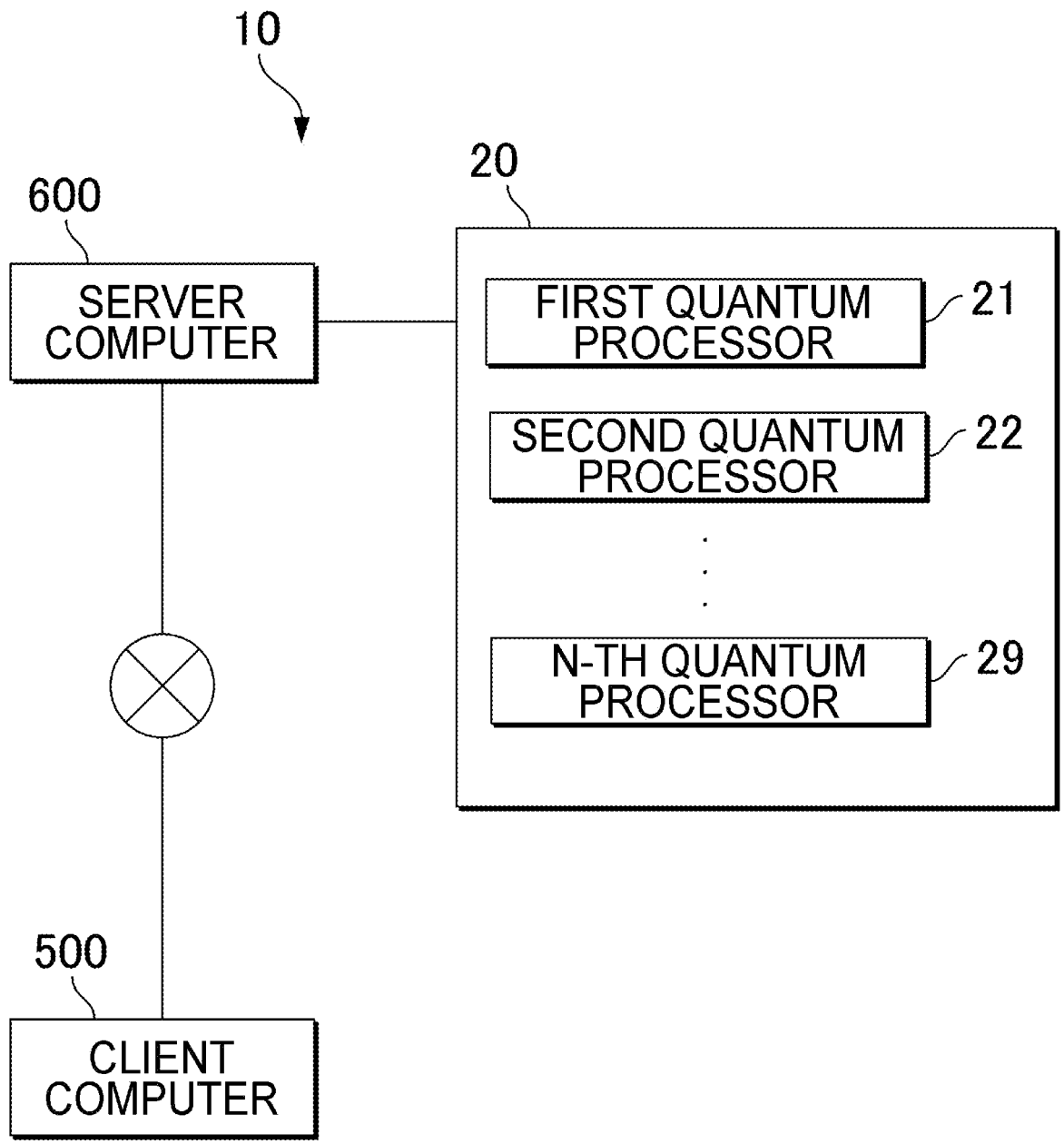
FIG. 1 illustrates the outline of a system according to an embodiment of the present disclosure.

An embodiment of the present disclosure will be specifically described below with reference to the accompanying drawings. The same elements are indicated by the same reference numerals, and an explanation thereof is omitted.

The present embodiment will describe a system 10 in which a plurality of quantum processors is connected to configure a logical quantum bit. Even if an error is detected in the quantum processors of a first group, error checking is performed again by the quantum processors of a second group so as to reduce the probability of improper error correction.

Application Example of the System

FIG. 1 illustrates the outline of the system 10 according to the embodiment of the present disclosure. The system 10 includes a client computer 500, a server computer 600, and a quantum processor 20. The client computer 500 and the server computer 600 are configured with general-purpose classical computers as will be specifically described later. The quantum processor 20 may be a quantum computer that includes a first quantum processor 21, a second quantum processor 22, and an N-th quantum processor 29 (N is a natural number equal to or larger than 3), includes a plurality of physical quantum bits, and performs a quantum operation by performing a gate control on the quantum bits. In the quantum processor 20, at least one logical quantum bit is configured with the physical quantum bits provided for the first quantum processor 21, the second quantum processor 22, and the N-th quantum processor 29. The quantum processor 20 performs a gate control and a quantum operation while performing error checking and error correction on the logical quantum bit.

The client computer 500 is connected to the server computer 600 via a communication network, e.g., the Internet. The server computer 600 is connected to the quantum processor 20 via a communication network, e.g., a local area network (LAN). A user of the client computer 500 indirectly sends a command to the quantum processor 20 by controlling the client computer 500 and performs a quantum operation by using the quantum processor 20. The configuration of the system 10 is not limited to that of the application example. For example, the quantum processor 20 may be connected to the client computer 500 via a communication network, e.g., a LAN instead of the server computer 600.

Figure 2:
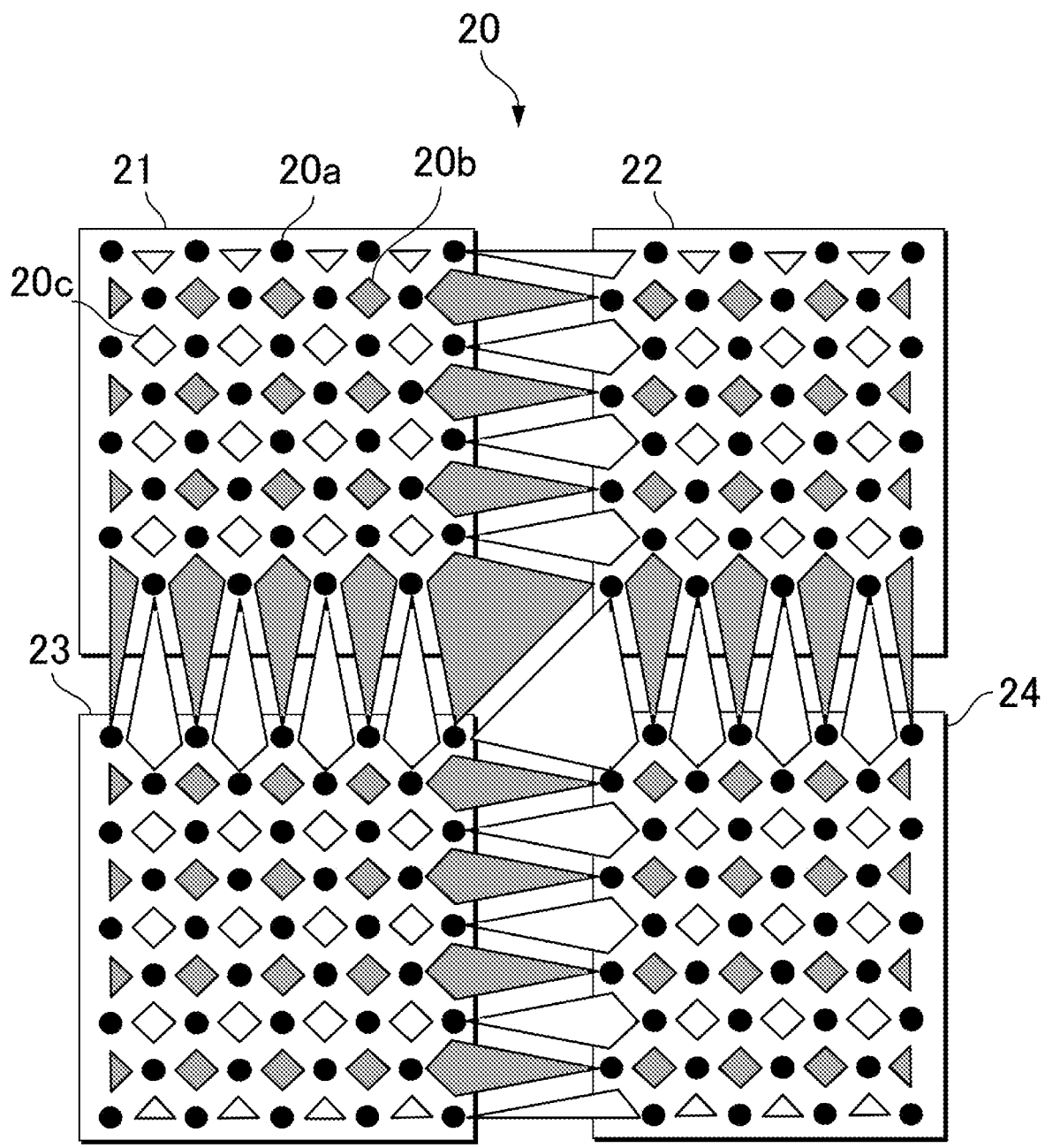
FIG. 2 illustrates an example of quantum processors according to the present embodiment.

FIG. 2 illustrates an example of the quantum processors according to the present embodiment. In the present example, the first quantum processor 21, the second quantum processor 22, a third quantum processor 23, and a fourth quantum processor 24 are illustrated. The number of quantum processors is not limited thereto.

The first quantum processor 21, the second quantum processor 22, the third quantum processor 23, and the fourth quantum processor 24 each include a plurality of physical quantum bits. The quantum processors according to the present embodiment perform error checking, error correction, and a quantum operation by using the logical quantum bit encoded by a topological surface code. Thus, the physical quantum bits include data quantum bits 20a, Z-measurement quantum bits 20b, and X-measurement quantum bits 20c.

The first quantum processor 21, the second quantum processor 22, the third quantum processor 23, and the fourth quantum processor 24 indicate an example of the quantum processors of a first group. The physical quantum bits included in the first quantum processor 21, the second quantum processor 22, the third quantum processor 23, and the fourth quantum processor 24 constitute a logical quantum bit. The Z-measurement quantum bits 20b and the X-measurement quantum bits 20c on the edges of the first quantum processor 21, the second quantum processor 22, the third quantum processor 23, and the fourth quantum processor 24 are each disposed across the adjacent processors. For example, the Z-measurement quantum bits 20b and the X-measurement quantum bits 20c on the right end of the first quantum processor 21 and the Z-measurement quantum bits 20b and the X-measurement quantum bits 20c on the left end of the second quantum processor 22 are disposed across the first quantum processor 21 and the second quantum processor 22. The physical quantum bits included in the quantum processors of the first group are coupled over the quantum processors of the first group.

The first quantum processor 21, the second quantum processor 22, the third quantum processor 23, and the fourth quantum processor 24 perform error checking about the logical quantum bit. The error checking includes a plurality of error syndrome measurements. Specifically, the error syndrome measurements may be conducted by measuring all of the Z-measurement quantum bits 20b and the X-measurement quantum bits 20c and checking the parity thereof. In the presence of a point where even parity and odd parity are inverted, a Z error or an X error is present.

Figure 3:
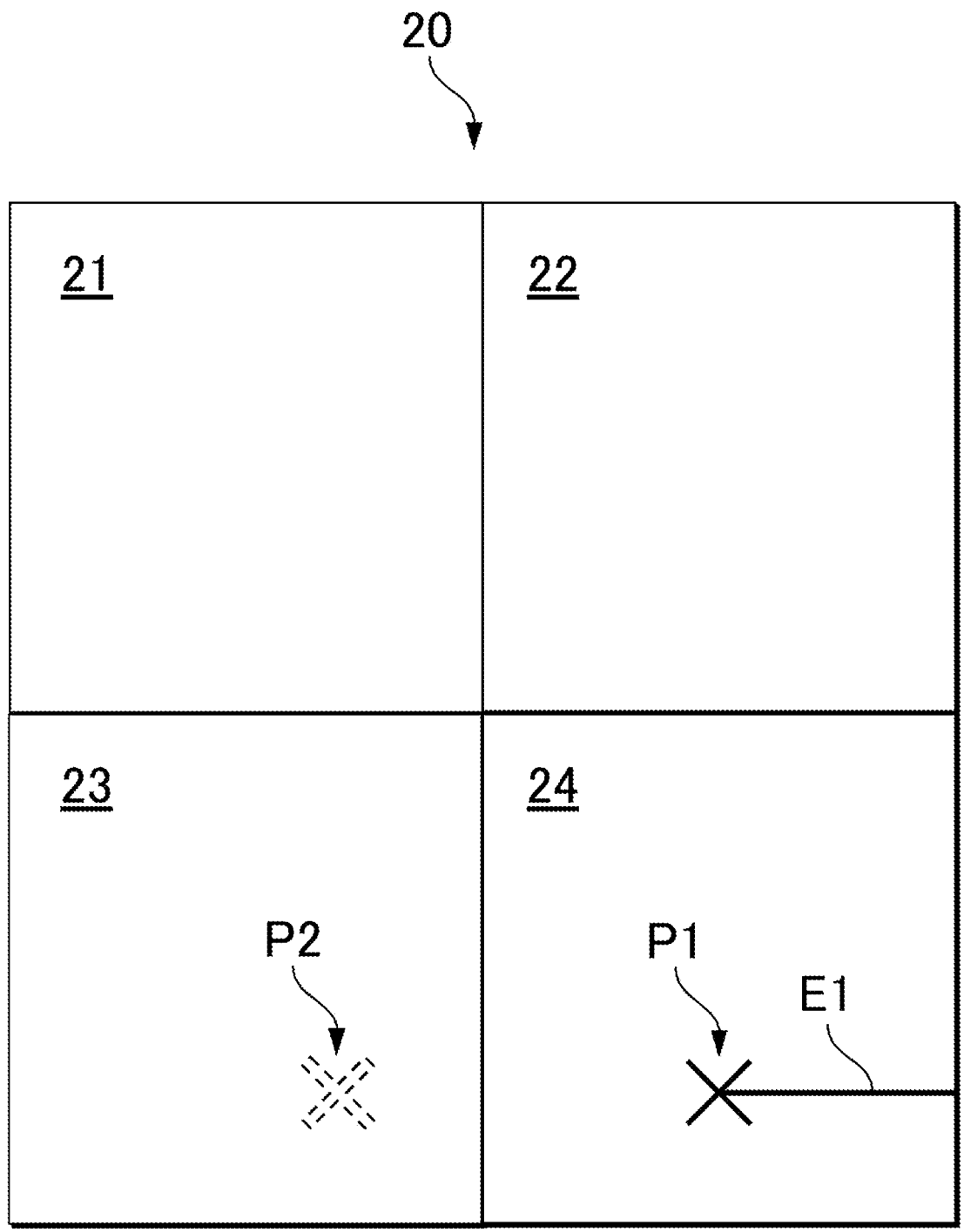
FIG. 3 illustrates a first example of an error in the quantum processors of a first group according to the present embodiment.

FIG. 3 illustrates a first example of an error in the quantum processors of the first group according to the present embodiment. FIG. 3 schematically illustrates the quantum processors of the first group (the first quantum processor 21, the second quantum processor 22, the third quantum processor 23, and the fourth quantum processor 24). A plurality of data quantum bits having an error are denoted as error quantum bits E1, and the Z-measurement quantum bits or X-measurement quantum bits have inverted parity at a first inversion point P1.

In the present example, the third quantum processor 23 improperly operates due to malware or the like. Although an actual error does not occur in the third quantum processor 23, the system 10 is notified of a second inversion point P2 as false information. Thus, the system 10 attempts to correct an error on the assumption that the error has occurred in a section between the first inversion point P1 and the second inversion point P2. Specifically, the system 10 causes an X operator or a Z operator to act on data quantum bits in the section between the first inversion point P1 and the second inversion point P2, across the third quantum processor 23 and the fourth quantum processor 24.

Figure 4:
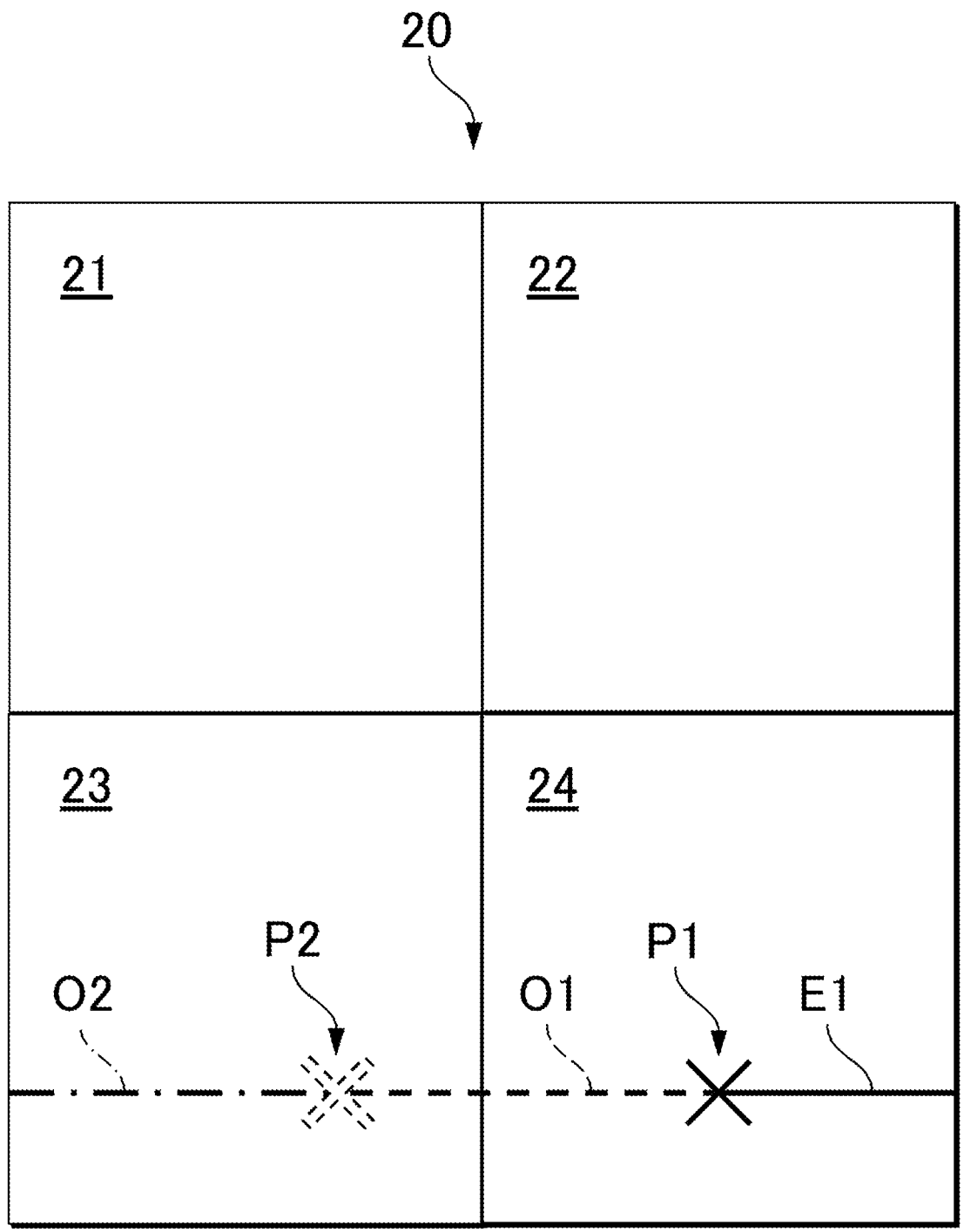
FIG. 4 illustrates a second example of an error in the quantum processors of the first group according to the present embodiment.

FIG. 4 illustrates a second example of an error in the quantum processors of the first group according to the present embodiment. FIG. 4 indicates actual error quantum bits E1 and a section O1 in which an error of data quantum bits has been corrected between the first inversion point P1 and the second inversion point P2. In this case, the third quantum processor 23 that improperly operates due to malware or the like causes the same operator as in the section O1 to act in a section O2. Thus, the X operator or the Z operator is caused to act across the third quantum processor 23 and the fourth quantum processor 24, thereby performing an X operation or a Z operation on the logical quantum bit. In this way, by only an improper operation of the third quantum processor 23 from among the quantum processors of the first group due to malware or the like, an unexpected quantum operation may be performed on the logical quantum bit.

Figure 5:
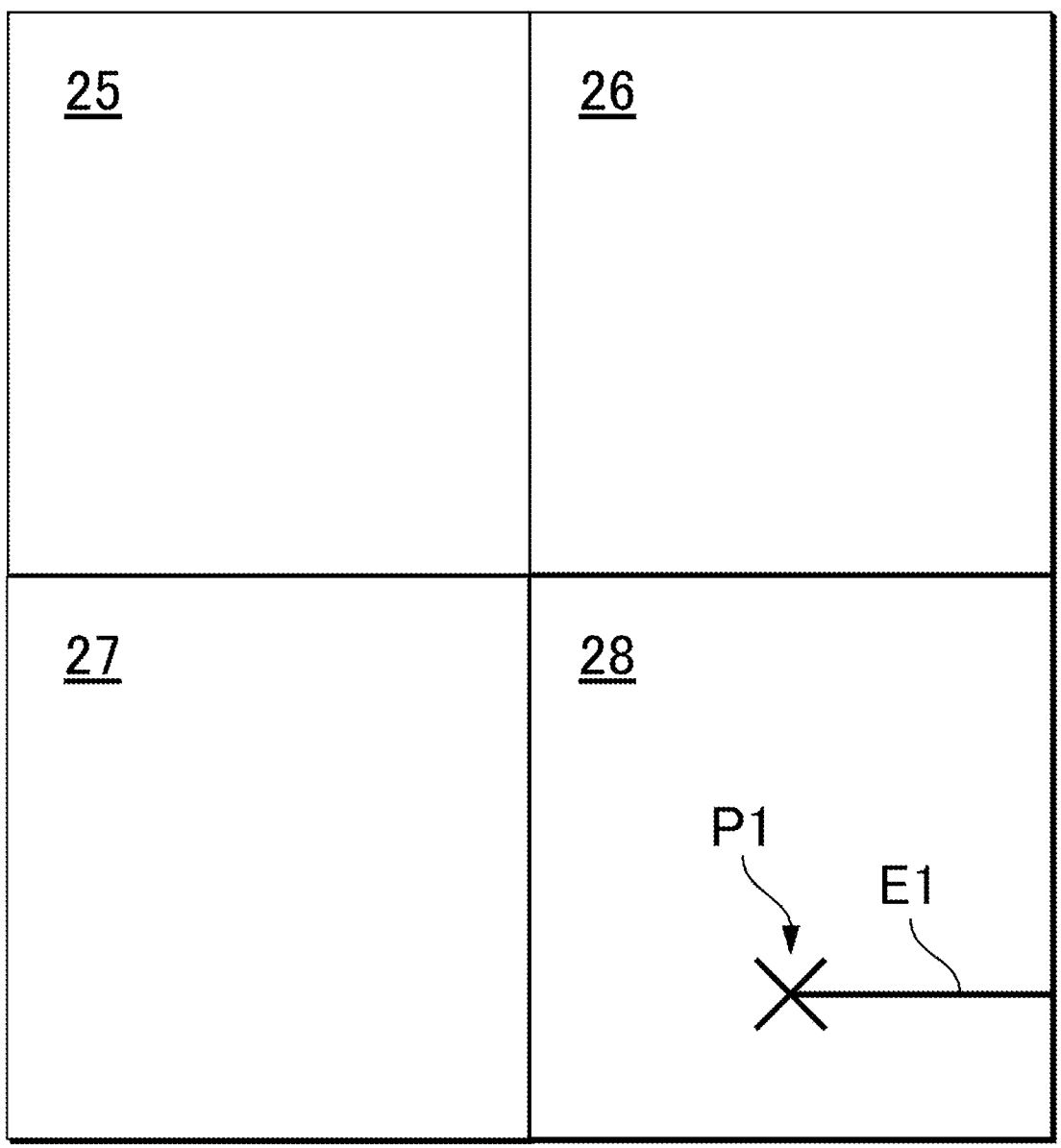
FIG. 5 illustrates an example of an error in the quantum processors of a second group according to the present embodiment.

FIG. 5 illustrates an example of an error in the quantum processors of the second group according to the present embodiment. In the system 10 according to the present embodiment, even if some of the quantum processors improperly operate due to malware or the like, at least double error checking is performed to prevent an unexpected quantum operation on the logical quantum bit.

FIG. 5 schematically illustrates a fifth quantum processor 25, a sixth quantum processor 26, a seventh quantum processor 27, and an eighth quantum processor 28. The fifth quantum processor 25, the sixth quantum processor 26, the seventh quantum processor 27, and the eighth quantum processor 28 indicate an example of the quantum processors of a second group. Physical quantum bits included in the fifth quantum processor 25, the sixth quantum processor 26, the seventh quantum processor 27, and the eighth quantum processor 28 constitute a logical quantum bit. Z-measurement quantum bits and X-measurement quantum bits on the edges of the fifth quantum processor 25, the sixth quantum processor 26, the seventh quantum processor 27, and the eighth quantum processor 28 are each disposed across the adjacent processors. For example, the Z-measurement quantum bits and the X-measurement quantum bits on the right end of the fifth quantum processor 25 and the Z-measurement quantum bits and the X-measurement quantum bits on the left end of the sixth quantum processor 26 are disposed across the fifth quantum processor 25 and the sixth quantum processor 26. The physical quantum bits included in the quantum processors of the second group are coupled over the quantum processors of the second group.

If an error is detected at least in error checking on the quantum processors of the first group, the system 10 of the present embodiment swaps the quantum state of the quantum processors of the first group with the quantum state of the quantum processors of the second group and performs error checking on the logical quantum bit configured with the quantum processors of the second group. If the quantum processors of the second group do not include a quantum processor that improperly operates due to malware or the like, only the first inversion point P1 is detected by error checking on the logical quantum bit configured with the quantum processors of the second group.

The system 10 selects a plurality of error syndrome measurement results based on a comparison between the results of error syndrome measurements in the quantum processors of the first group and the results of error syndrome measurements in the quantum processors of the second group and corrects an error based on the selected error syndrome measurement results. For example, the system 10 may correct an error based on the results of error syndrome measurements included in both of the results of error syndrome measurements in the quantum processors of the first group and the results of error syndrome measurements in the quantum processors of the second group.

In the present example, the first inversion point P1 is included in the results of error syndrome measurements in the quantum processors of the first group and the results of error syndrome measurements in the quantum processors of the second group. Thus, the system 10 corrects an error by causing the X operator or the Z operator to act on the error quantum bits E1. This can properly correct the error quantum bits E1 having an actual error. In other words, the system 10 according to the present embodiment can obtain the quantum processors with Byzantine Fault Tolerance.

The system 10 may perform error checking by using the quantum processors of a third group as well as the quantum processors of the first group and the quantum processors of the second group. In this case, the quantum processors of the third group configure at least one logical quantum bit including a plurality of physical quantum bits. If an error is detected at least in error checking on the quantum bits of the first group, the system 10 swaps the quantum state of the quantum processors of the second group with the quantum state of the quantum processors of the third group. Furthermore, the quantum processors of the third group perform error checking on the logical quantum bit.

The system 10 may correct an error after selecting error syndrome measurement results by means of majority decision on the results of error syndrome measurements in the quantum processors of the first group, the results of error syndrome measurements in the quantum processors of the second group, and the results of error syndrome measurements in the quantum processors of the third group. The system 10 may correct an error based on error syndrome measurement results included in all of the results of error syndrome measurements in the quantum processors of the first group, the results of error syndrome measurements in the quantum processors of the second group, and the results of error syndrome measurements in the quantum processors of the third group. By using the quantum processors of three or more groups, the occurrence of an improper operation can be further reduced when a plurality of quantum processors is connected to configure a logical quantum bit.

In the foregoing example, the logical quantum bit of the topological surface code is configured with the two-dimensionally arranged physical quantum bits, and error checking, error correction, and a quantum operation are performed on the logical quantum bit. The quantum processor according to the present embodiment is not limited to this example. In the following example serving as a modification of the present embodiment, a logical quantum bit is configured with three-dimensionally arranged physical quantum bits, and error checking, error correction, and a quantum operation are performed on the logical quantum bit.

Figure 6:
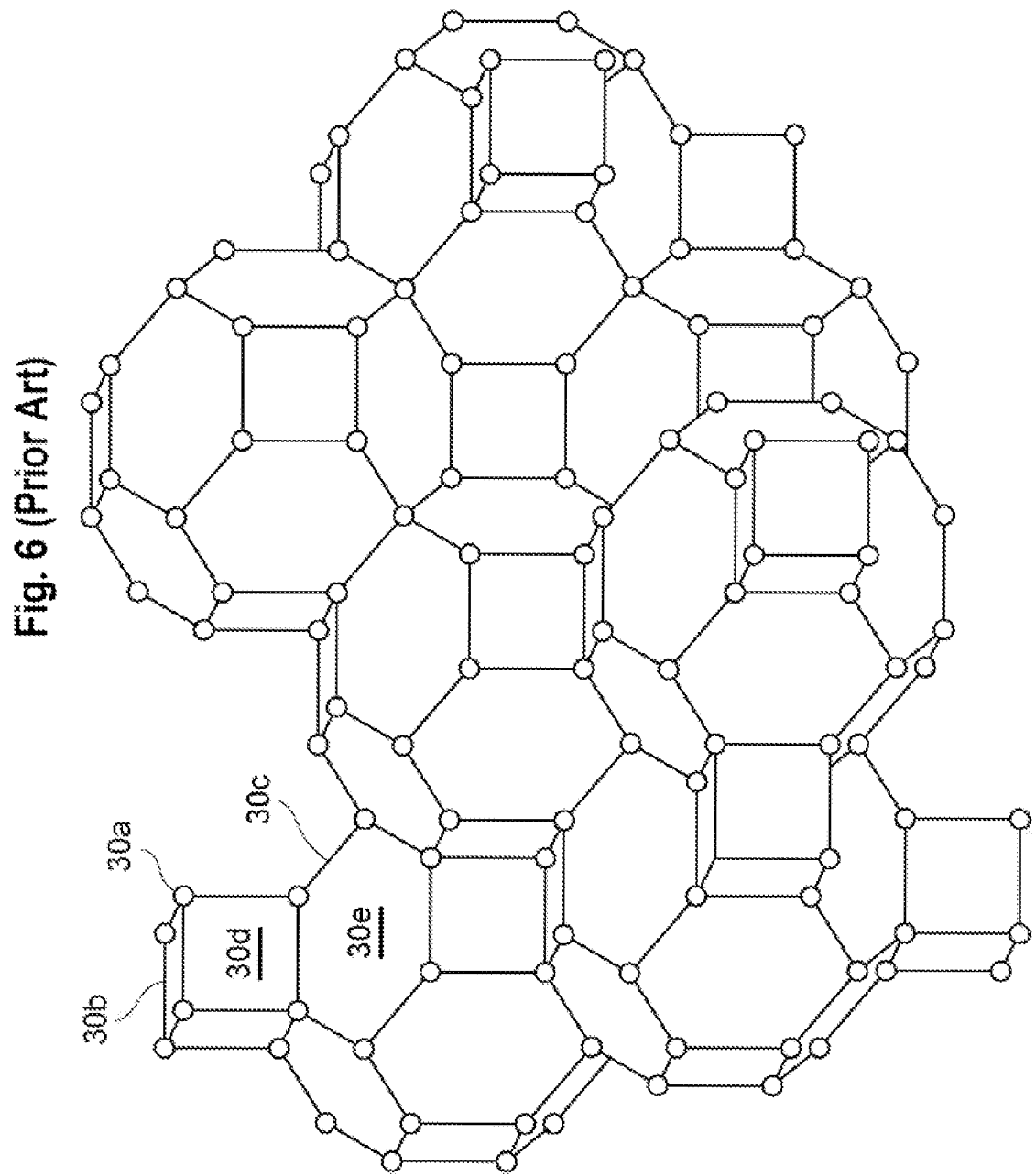
FIG. 6 illustrates an example of a conventional three-dimensional topological code.

FIG. 6 illustrates an example of a conventional three-dimensional topological code. FIG. 6 illustrates an example of a three-dimensional topological code described in Benjamin J. Brown, Naomi H. Nickerson and Dan E. Browne, "Fault-tolerant error correction with the gauge color code", Nature Communications volume 7, 12302, 2016.

The quantum code of the present example is configured with a plurality of physical quantum bits and includes a plurality of data quantum bits 30a, first X-error syndrome measurement quantum bits 30b configured with the data quantum bits 30a disposed at the apexes of a hexahedron (cube), second X-error syndrome measurement quantum bits 30c configured with the data quantum bits 30a disposed at the apexes of an octadecahedron (cube), first Z-error syndrome measurement quantum bits 30d configured on each face of the hexahedron, and second Z-error syndrome measurement quantum bits 30e configured on each face of the octadecahedron.

Error checking on the quantum code of the present example includes a plurality of error syndrome measurements. Specifically, the error syndrome measurements may be conducted by measuring all of the first X-error syndrome measurement quantum bits 30b, the second X-error syndrome measurement quantum bits 30c, the first Z-error syndrome measurement quantum bits 30d, and the second Z-error syndrome measurement quantum bits 30e and checking the parity thereof. In the presence of a point where even parity and odd parity are inverted, a Z error or an X error is present.

Figure 7:
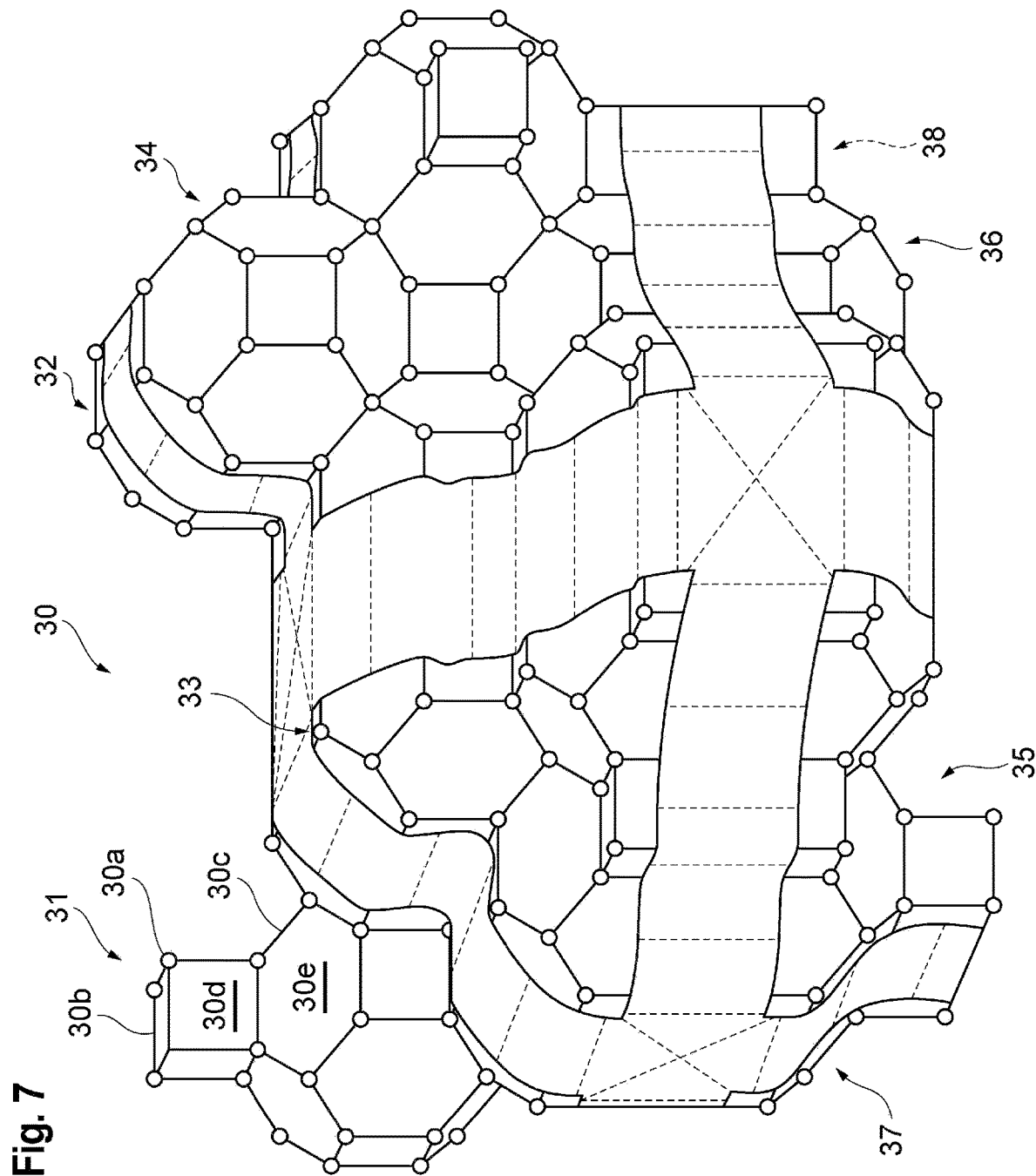
FIG. 7 illustrates an example of quantum processors according to a modification of the present embodiment.

FIG. 7 illustrates an example of quantum processors according to a modification of the present embodiment. A quantum processor 30 according to the present modification includes a first quantum processor 31, a second quantum processor 32, a third quantum processor 33, a fourth quantum processor 34, a fifth quantum processor 35, a sixth quantum processor 36, a seventh quantum processor 37, and an eighth quantum processor 38. The number of quantum processors is not limited thereto. The eighth quantum processor 38 is disposed behind the sixth quantum processor 36 and thus is not illustrated in FIG. 7.

The first quantum processor 31, the second quantum processor 32, the third quantum processor 33, the fourth quantum processor 34, the fifth quantum processor 35, the sixth quantum processor 36, the seventh quantum processor 37, and the eighth quantum processor 38 each include a plurality of physical quantum bits. The quantum processors according to the present modification perform error checking, error correction, and a quantum operation by using a logical quantum bit encoded by a three-dimensional topological code. Thus, the physical quantum bits include the data quantum bits 30a, the first X-error syndrome measurement quantum bits 30b, the second X-error syndrome measurement quantum bits 30c, the first Z-error syndrome measurement quantum bits 30d, and the second Z-error syndrome measurement quantum bits 30e.

The first quantum processor 31, the second quantum processor 32, the third quantum processor 33, the fourth quantum processor 34, the fifth quantum processor 35, the sixth quantum processor 36, the seventh quantum processor 37, and the eighth quantum processor 38 indicate an example of the quantum processors of a first group. Physical quantum bits included in the first quantum processor 31, the second quantum processor 32, the third quantum processor 33, the fourth quantum processor 34, the fifth quantum processor 35, the sixth quantum processor 36, the seventh quantum processor 37, and the eighth quantum processor 38 constitute a logical quantum bit. The first X-error syndrome measurement quantum bits 30b, the second X-error syndrome measurement quantum bits 30c, the first Z-error syndrome measurement quantum bits 30d, and the second Z-error syndrome measurement quantum bits 30e that are disposed on the edges of the first quantum processor 31, the second quantum processor 32, the third quantum processor 33, the fourth quantum processor 34, the fifth quantum processor 35, the sixth quantum processor 36, the seventh quantum processor 37, and the eighth quantum processor 38 are each disposed across the adjacent processors. For example, parity is checked across the first quantum processor 31 and the second quantum processor 32 by the first X-error syndrome measurement quantum bits 30b and the second X-error syndrome measurement quantum bits 30c that are disposed on the edge of the first quantum processor 31 and the first X-error syndrome measurement quantum bits 30b and the second X-error syndrome measurement quantum bits 30c that are disposed on the edge of the second quantum processor 32. The physical quantum bits included in the quantum processors of the first group are coupled over the quantum processors of the first group.

The first quantum processor 31, the second quantum processor 32, the third quantum processor 33, the fourth quantum processor 34, the fifth quantum processor 35, the sixth quantum processor 36, the seventh quantum processor 37, and the eighth quantum processor 38 perform error checking on the logical quantum bits. The error checking includes a plurality of error syndrome measurements. Specifically, the error syndrome measurements may be conducted by measuring all of the first X-error syndrome measurement quantum bits 30b, the second X-error syndrome measurement quantum bits 30c, the first Z-error syndrome measurement quantum bits 30d, and the second Z-error syndrome measurement quantum bits 30e and checking the parity thereof. In the presence of a point where even parity and odd parity are inverted, a Z error or an X error is present.

The system according to the present modification includes the quantum processors of a second group with the same configuration as the quantum processors of the first group (the first quantum processor 31, the second quantum processor 32, the third quantum processor 33, the fourth quantum processor 34, the fifth quantum processor 35, the sixth quantum processor 36, the seventh quantum processor 37, and the eighth quantum processor 38). If an error is detected at least in error checking on the quantum processors of the first group, the system according to the present modification swaps the quantum state of the quantum processors of the first group with the quantum state of the quantum processors of the second group and performs error checking on the logical quantum bit configured with the quantum processors of the second group. The system according to the present modification selects a plurality of error syndrome measurement results based on a comparison between the results of error syndrome measurements in the quantum processors of the first group and the results of error syndrome measurements in the quantum processors of the second group and corrects an error based on the selected error syndrome measurement results. For example, the system may correct an error based on the results of error syndrome measurements included in both of the results of error syndrome measurements in the quantum processors of the first group and the results of error syndrome measurements in the quantum processors of the second group. This can properly correct the error quantum bits having an actual error, obtaining quantum processors with Byzantine Fault Tolerance.

The system according to the present modification may perform error checking by using the quantum processors of a third group as well as the quantum processors of the first group and the quantum processors of the second group. In this case, the quantum processors of the third group configure at least one logical quantum bit including a plurality of physical quantum bits. If an error is detected at least in error checking on the quantum bits of the first group, the system 10 swaps the quantum state of the quantum processors of the second group with the quantum state of the quantum processors of the third group. Furthermore, the quantum processors of the third group perform error checking on the logical quantum bit.

The system according to the present modification may correct an error after selecting error syndrome measurement results by means of majority decision on the results of error syndrome measurements in the quantum processors of the first group, the results of error syndrome measurements in the quantum processors of the second group, and the results of error syndrome measurements in the quantum processors of the third group. The system may correct an error based on error syndrome measurement results included in all of the results of error syndrome measurements in the quantum processors of the first group, the results of error syndrome measurements in the quantum processors of the second group, and the results of error syndrome measurements in the quantum processors of the third group. By using the quantum processors of three or more groups, the occurrence of an improper operation can be further reduced when a plurality of quantum processors is connected to configure a logical quantum bit.

Configuration Example

Figure 8:
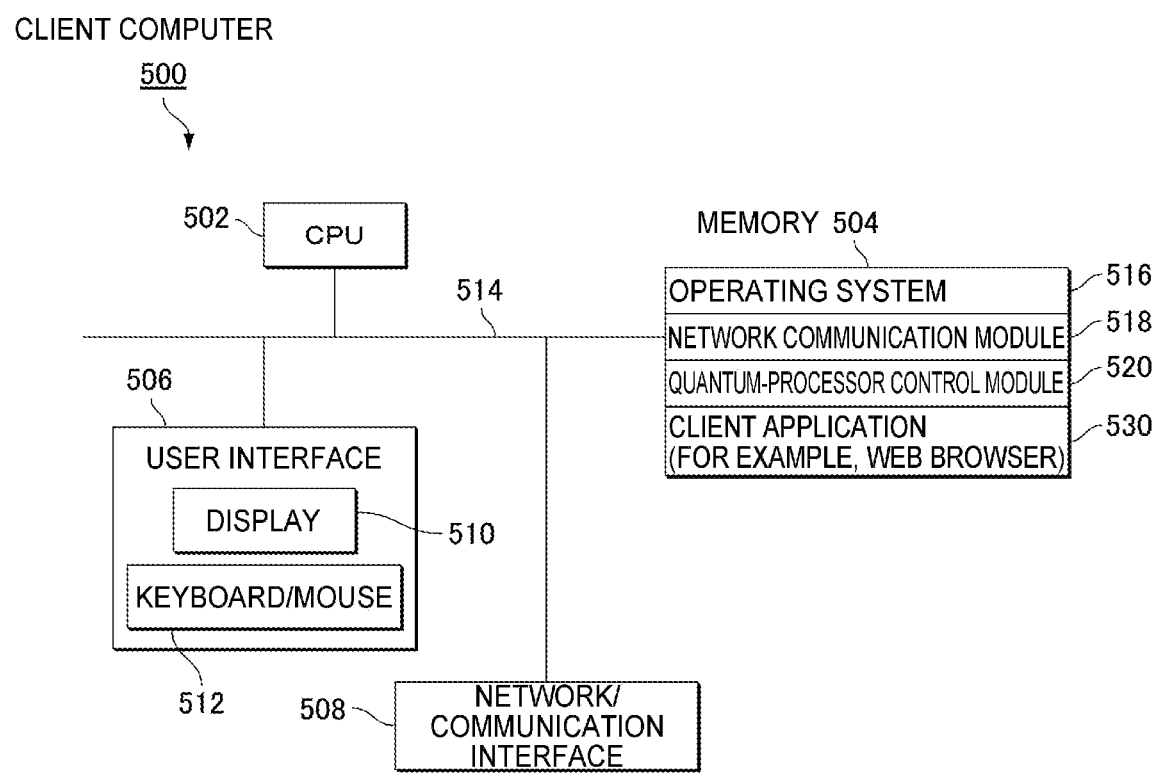
FIG. 8 illustrates the configuration of a client computer according to the present embodiment.

FIG. 8 is a block diagram illustrating the client computer 500 according to an embodiment. The client computer 500 typically includes at least one processing unit (CPU) 502, at least one network or another communication interface 508, a memory 504, and at least one communication bus 514 for connecting these constituent elements.

The client computer 500 may further include a user interface 506 provided with a display device 510 and a keyboard and/or mouse (or any other pointing devices) 512.

The memory 504 is, for example, a high random access memory such as a DRAM, an SRAM, a DDR RAM or other random-access solid-state storage devices. The memory 504 may be a nonvolatile memory such as at least one magnetic disk storage device, optical disk storage device, flash memory device, or other nonvolatile solid-state storage devices.

As another example of the memory 504, at least one storage device at a remote location from the CPU 502 may be used. In one embodiment, the memory 504 stores a program, a module, a data structure, or a subset thereof, which will be described below.

An operating system 516 includes, for example, a procedure for processing various basic system services and performing a task by means of hardware.

For example, a network communication module 518 is used for connecting the client computer 500 to another computer via the at least one network/communication interface 508 and at least one communication network, e.g., the Internet, other wide area networks, local area networks, and metropolitan area networks.

A quantum-processor control module 520 receives, for example, the input of information for configuring a logical quantum bit by the quantum processor 20 and information for error checking, the information being received via the keyboard and/or mouse 512. The information is then transmitted to the server computer 600. The quantum-processor control module 520 performs error checking on the logical quantum bit configured by the quantum processors of the first group. If an error is detected at least in error checking on the quantum processors of the first group, the quantum-processor control module 520 swaps the quantum state of the quantum processors of the first group with the quantum state of the quantum processors of the second group and obtains, from the quantum processor 20 via the server computer 600, the result of error checking on the logical quantum bit configured by the quantum processors of the second group or directly obtains the result of error checking from the quantum processor 20 without the server computer 600.

A client application 530 includes, for example, a web browser.

The at least one processing unit (CPU) 502 optionally reads modules from the memory 504 and executes the modules. For example, the at least one processing unit (CPU) 502 may configure a communication unit by executing the network communication module 518 stored in the memory 504. Moreover, the at least one processing unit (CPU) 502 may configure a quantum-processor control unit by executing the quantum-processor control module 520 stored in the memory 504. In this case, the quantum-processor control unit may be configured in the CPU 502.

In another embodiment, the quantum-processor control module 520 may be a stand-alone application stored in the memory 504 of the client computer 500. The stand-alone application may be, but is not limited to, a quantum-processor control application. In another embodiment, the quantum-processor control module 520 may be an add-on or a plug-in to another application. For example, the quantum-processor control module 520 may be a plug-in to a web browser application or an email application.

In an embodiment, received data items can be locally cached in the memory 504. Likewise, operation results by the quantum processor 20 can be locally cached in the memory 504.

The foregoing elements can be each stored in at least one of the storage devices. Each of the modules corresponds to a command set for performing the foregoing functions. The modules or programs (that is, a command set) do not always need to be installed as separate software programs, procedures, or modules. Thus, various subsets of these modules may be combined or reconstructed in various embodiments. In one embodiment, the memory 504 can store the subset of the modules and the data structure. Furthermore, the memory 504 can store additional module and data structure, which are not described above.

Figure 9:
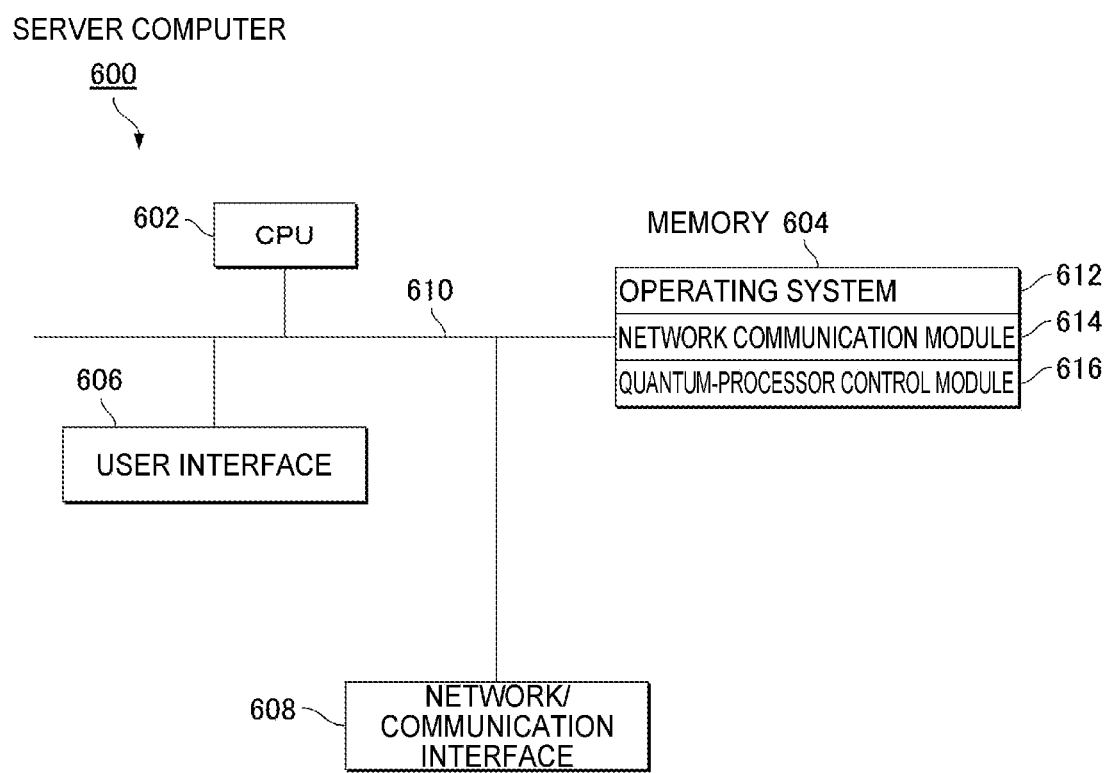
FIG. 9 illustrates the configuration of a server computer according to the present embodiment.

FIG. 9 is a block diagram illustrating the server computer 600 according to an embodiment. The server computer 600 typically includes at least one processing unit (CPU) 602, at least one network or another communication interface 608, a memory 604, and at least one communication bus 610 for connecting these constituent elements.

The server computer 600 may include a user interface 606 that includes a display device (not illustrated) and a keyboard and/or mouse (not illustrated).

The memory 604 is, for example, a high random access memory such as a DRAM, an SRAM, a DDR RAM or other random-access solid-state storage devices. The memory 604 may be a nonvolatile memory such as at least one magnetic disk storage device, optical disk storage device, flash memory device, or other nonvolatile solid-state storage devices.

As another example of the memory 604, at least one storage device at a remote location from the CPU 602 may be used. In one embodiment, the memory 604 stores a program, a module, a data structure, or a subset thereof, which will be described below.

An operating system 612 includes, for example, a procedure for processing various basic system services and performing a task by means of hardware.

For example, a network communication module 614 is used for connecting the server computer 600 to another computer via the at least one network/communication interface 608 and at least one communication network, e.g., the Internet, other wide area networks, local area networks, and metropolitan area networks.

A quantum-processor control module 616 receives, for example, information for configuring a logical quantum bit by the quantum processor 20 and information for error checking and controls the quantum processor 20, the information being received from the client computer 500. The quantum-processor control module 616 performs error checking on the logical quantum bit configured by the quantum processors of the first group. If an error is detected at least in error checking on the quantum processors of the first group, the quantum-processor control module 616 swaps the quantum state of the quantum processors of the first group with the quantum state of the quantum processors of the second group and obtains, from the quantum processor 20, the result of error checking on the logical quantum bit configured by the quantum processors of the second group.

The foregoing elements can be each stored in at least one of the storage devices. Each of the modules corresponds to a command set for performing the foregoing functions. The modules or programs (that is, a command set) do not always need to be installed as separate software programs, procedures, or modules. Thus, various subsets of these modules can be combined or reconstructed in various embodiments. In one embodiment, the memory 604 can store the subset of the modules and the data structure. Furthermore, the memory 604 can store additional module and data structure, which are not described above.

FIG. 9 indicates "server computer". FIG. 9 is an explanatory drawing of various features that may be present in a server set, rather than a structural schematic of the embodiment described in the present specification. Actually, and as recognized by a person skilled in the art, separately indicated items can be combined and some of the items can be separated from the others. For example, items separately indicated in FIG. 9 can be installed on a single server, and one item can be installed on one or more servers.

Description of Operations

Figure 10:
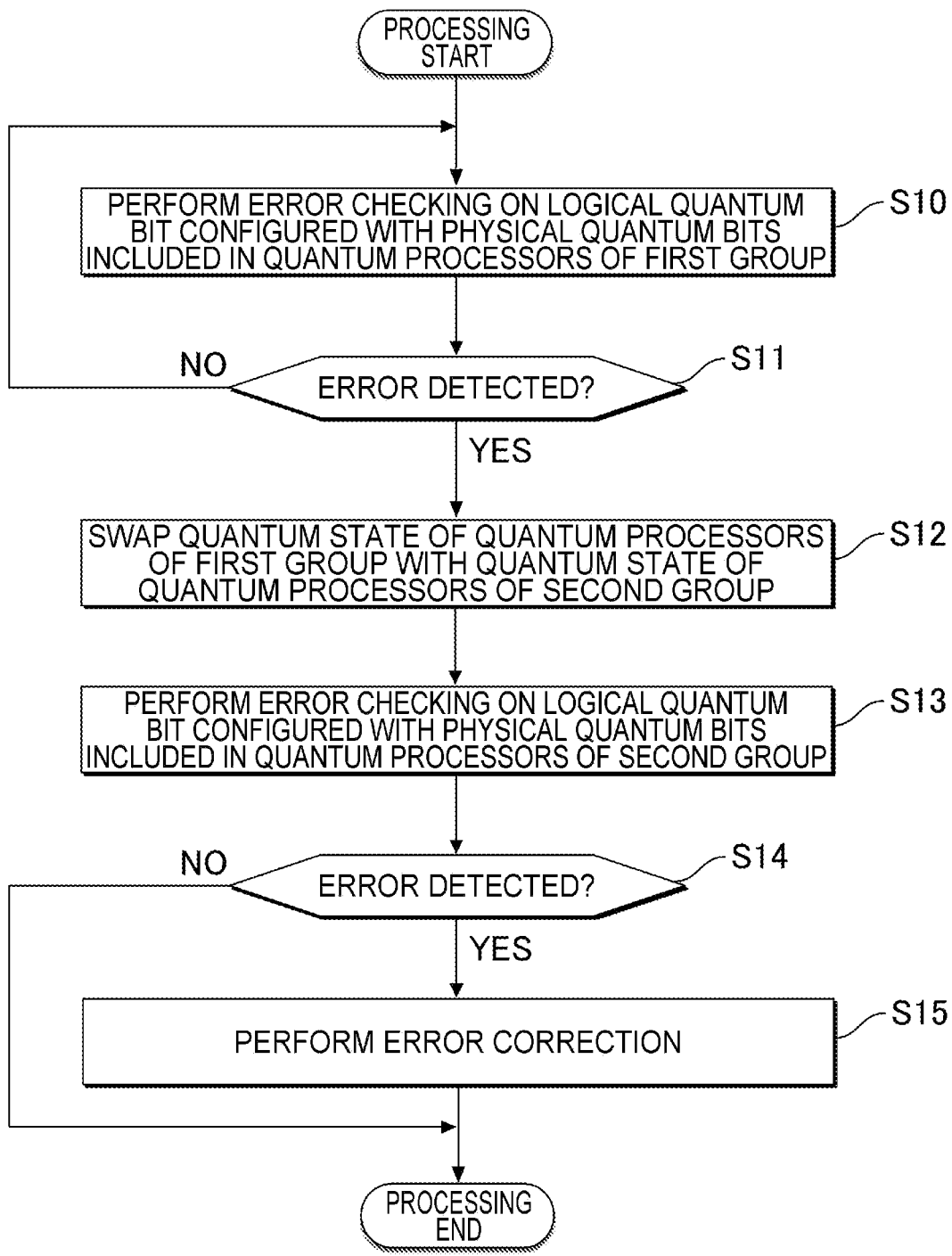
FIG. 10 is a flowchart of processing performed by the system according to the present embodiment.
Figure 11:
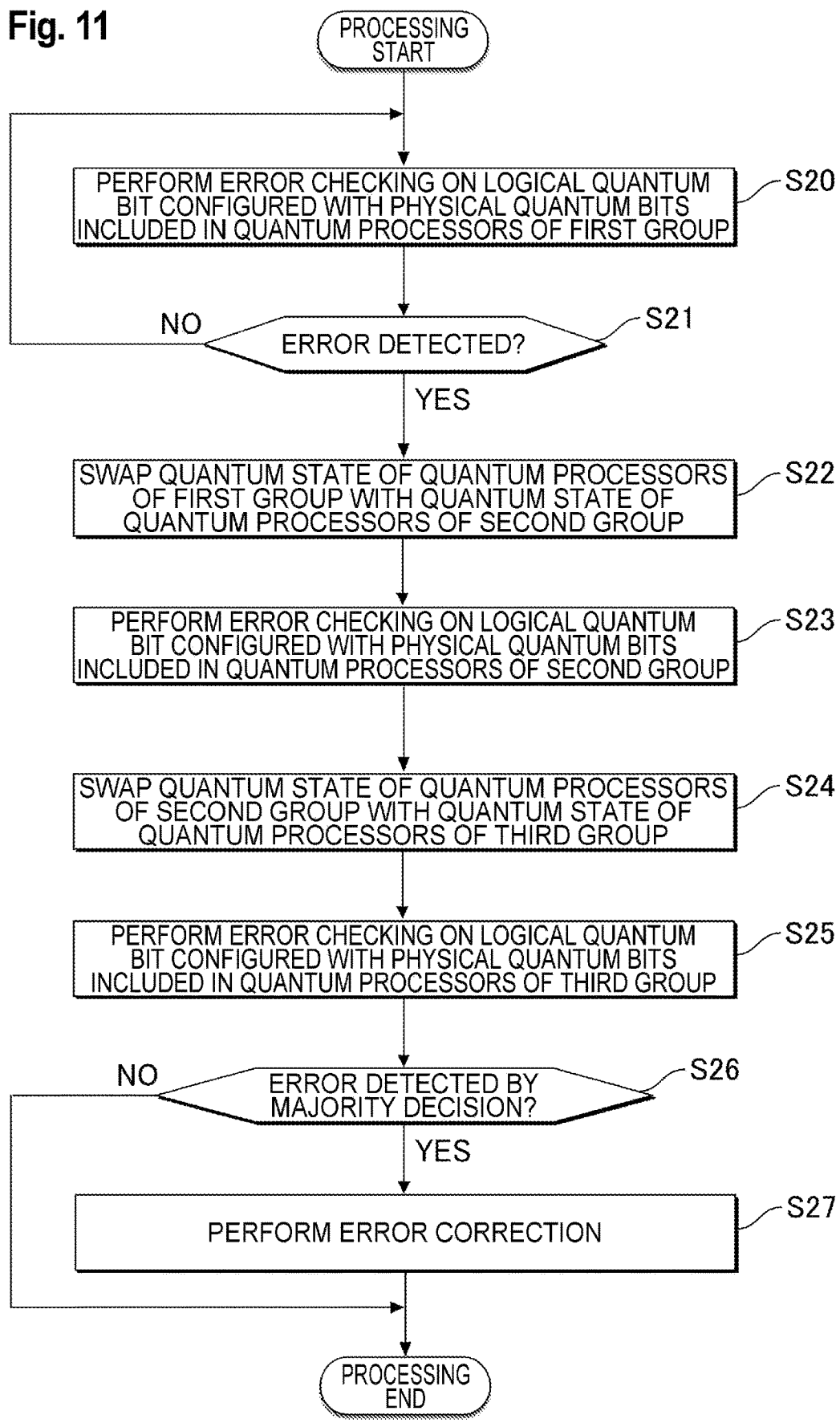
FIG. 11 is a flowchart of processing performed by the system according to the present embodiment.

The operations of the system 10 according to the present embodiment will be described below. FIGS. 10 and 11 are flowcharts indicating an example of the processing of the system 10 according to the present embodiment.

(Step S10)

The system 10 first performs error checking on the logical quantum bit configured with the physical quantum bits included in the quantum processors of the first group.

(Step S11)

If an error is not detected, the system 10 performs the processing of step S10 again. If an error is detected, the system 10 performs step S12.

(Step S12)

The system 10 swaps the quantum state of the quantum processors of the first group with the quantum state of the quantum processors of the second group.

(Step S13)

The system 10 then performs error checking on the logical quantum bit configured with the physical quantum bits included in the quantum processors of the second group.

(Step S14)

If an error is not detected, the system 10 terminates the processing without error correction even after an error is detected in step S11. If an error is detected in the quantum processors of the second group, the system 10 performs step S15.

(Step S15)

The system 10 performs error correction on the physical quantum bits.

Thus, the system 10 according to the present embodiment can reduce the probability of an improper operation in the overall configuration even if some of the quantum processors improperly operate while the quantum processors are connected to configure the logical quantum bit.

(Step S20)

The system 10 performs error checking on the logical quantum bit configured with the physical quantum bits included in the quantum processors of the first group.

(Step S21)

If an error is not detected, the system 10 performs the processing of step S20 again. If an error is detected, the system 10 performs step S22.

(Step S22)

The system 10 swaps the quantum state of the quantum processors of the first group with the quantum state of the quantum processors of the second group.

(Step S23)

The system 10 performs error checking on the logical quantum bit configured with the physical quantum bits included in the quantum processors of the second group.

(Step S24)

The system 10 further swaps the quantum state of the quantum processors of the second group with the quantum state of the quantum processors of the third group.

(Step S25)

The system 10 then performs error checking on the logical quantum bit configured with the physical quantum bits included in the quantum processors of the third group.

(Step S26)

If an error is not detected by majority decision on the results of error checking on the quantum processors of the first group, the quantum processors of the second group, and the quantum processors of the third group, the system 10 terminates the processing without error correction even after an error is detected in step S21. If an error is detected by majority decision, the system 10 performs step S27.

(Step S27)

The system 10 performs error correction on the physical quantum bits.

Thus, the system 10 according to the present embodiment can further reduce the probability of an improper operation in the overall configuration even if some of the quantum processors improperly operate while the quantum processors are connected to configure the logical quantum bit.

The disclosed technique is not limited to the foregoing embodiments and can be implemented in various other ways within the scope of the disclosed technique. Thus, the foregoing embodiments are merely exemplary in all aspects and should not be interpreted in a restricted manner. For example, the order of the processing steps can be optionally changed unless the processing steps are inconsistent with the processing contents.

The program according to the embodiment of the present disclosure may be provided while being stored in a computer-readable storage medium. The storage medium can store the program in "non-transitory and tangible medium." For example, the program includes but is not limited to a software program and a computer program.

What is claimed is:

1. A system comprising a plurality of quantum processors, each including a plurality of physical quantum bits, the system performing an information processing method, the method including:
    a first group of quantum processors from among the plurality of quantum processors configuring at least one first logical quantum bit including the physical quantum bits associated with the first group of quantum processors;
    the first group of quantum processors performing first error checking on the at least one first logical quantum bit;
    a second group of quantum processors from among the plurality of quantum processors configuring at least one second logical quantum bit including the physical quantum bits associated with the second group of quantum processors;
    if an error is detected at least in the first error checking on the first group of quantum processors, the system swapping a quantum state of the first group of quantum processors with a quantum state of the second group of quantum processors; and
    the system performing second error checking on the at least one second logical quantum bit.

2. The system according to claim 1, wherein:
    the physical quantum bits included in the first group of quantum processors are coupled over the first group of quantum processors; and
    the physical quantum bits included in the second group of quantum processors are coupled over the second group of quantum processors.

3. The system according to claim 1, wherein:
    the first error checking and the second error checking each include a plurality of error syndrome measurements;
    results of the error syndrome measurements are selected based on a comparison between results of the error syndrome measurements of the first group of quantum processors and results of the error syndrome measurements in the second group of quantum processors; and
    an error is corrected based on the selected results of the error syndrome measurements.

4. The system according to claim 1, wherein the method further comprises:
    a third group of quantum processors from among the plurality of quantum processors configuring at least one third logical quantum bit including the physical quantum bits associated with the third group of quantum processors;
    if an error is detected at least in the third error checking on the second group of quantum processors, the system swapping a quantum state of the second group of quantum processors with a quantum state of the third group of quantum processors; and
    the system performing third error checking on the at least one third logical quantum bit.

5. An information processing method performed by a system comprising a plurality of quantum processors, each including a plurality of physical quantum bits, the method comprising:
- a first group of quantum processors from among the plurality of quantum processors configuring at least one first logical quantum bit including the physical quantum bits associated with the first group of quantum processors;
- the first group of quantum processors performing first error checking on the at least one first logical quantum bit;
- a second group of quantum processors from among the plurality of quantum processors configuring at least one second logical quantum bit including the physical quantum bits associated with the second group of quantum processors;
- if an error is detected at least in the first error checking on the first group of quantum processors, the system swapping a quantum state of the first group of quantum processors with a quantum state of the second group of quantum processors; and
- the system performing second error checking on the at least one second logical quantum bit.

6. A non-transitory computer-readable storage medium for recording a program that, when executed by a system comprising a plurality of quantum processors, each including a plurality of physical quantum bits, causes the system to perform an information processing method, the method including:
- a first group of quantum processors from among the plurality of quantum processors configuring at least one first logical quantum bit including the physical quantum bits associated with the first group of quantum processors;
- the first group of quantum processors performing first error checking on the at least one first logical quantum bit;
- a second group of quantum processors from among the plurality of quantum processors configuring at least one second logical quantum bit including the physical quantum bits associated with the second group of quantum processors;
- if an error is detected at least in the first error checking on the first group of quantum processors, the system swapping a quantum state of the first group of quantum processors with a quantum state of the second group of quantum processors; and
- the system performing second error checking on the at least one second logical quantum bit.

\* \* \* \* \*